July 20, 1954   B. R. HOPKINS ET AL   2,684,432
DIELECTRIC HEATING APPARATUS
Filed Dec. 28, 1951   2 Sheets-Sheet 1

INVENTORS.
BOYD R. HOPKINS
WILLARD H. HICKOK
BY Woodcock and Phelan
ATTORNEYS

INVENTORS.
BOYD R. HOPKINS
BY WILLARD H. HICKOK

ATTORNEYS

Patented July 20, 1954

2,684,432

UNITED STATES PATENT OFFICE 2,684,432

DIELECTRIC HEATING APPARATUS

Boyd R. Hopkins and Willard H. Hickok, Louisville, Ky., assignors, by mesne assignments, to National Cylinder Gas Company, Chicago, Ill., a corporation of Delaware Application December 28, 1951, Serial No. 263,781

10 Claims. (Cl. 219—10.49)

This invention relates to dielectric heating apparatus, and particularly concerns dielectric heating systems in which load objects are passed through a series of two or more heating zones in which they are subjected to high-voltage high-frequency electric fields.

In accordance with the present invention, there is provided an elongated metallic tunnel structure through which the load objects are moved, as by conveyor, successively through the high-frequency fields of pairs of heating electrodes spaced along the tunnel structure and respectively coupled to high-frequency oscillators. Interchange of high-frequency energy between the successive heating zones is minimized by metal partitions extending transversely and longitudinally of the interior of the tunnel and so located that passageways are formed along and between the enclosed heating zones or compartments. The tunnel structure is provided with at least one door affording entrance to the passageways and the partitioning of each heating compartment is at least in part movable to permit access from a passageway to the conveyor, load objects and electrodes structure within each heating compartment. In the preferred arrangement, the shielding partitions between adjacent heating compartments also substantially shield the tunnel door from high-frequency energy from both adjacent compartments to either of which access may be had through the door.

Further in accordance with the invention, the passageway along the heating compartments may be and preferably is utilized as part of a ventilation system for the heating compartments. Moreover, the ventilating and drying equipment within this passageway may be also accessible through the same door which provides access to the heating compartments.

The invention further resides in features of construction, combination and arrangement hereinafter described and claimed.

For a more complete understanding of the invention and for illustration of one embodiment thereof, reference is made to the accompanying drawings in which.

Figure 2:
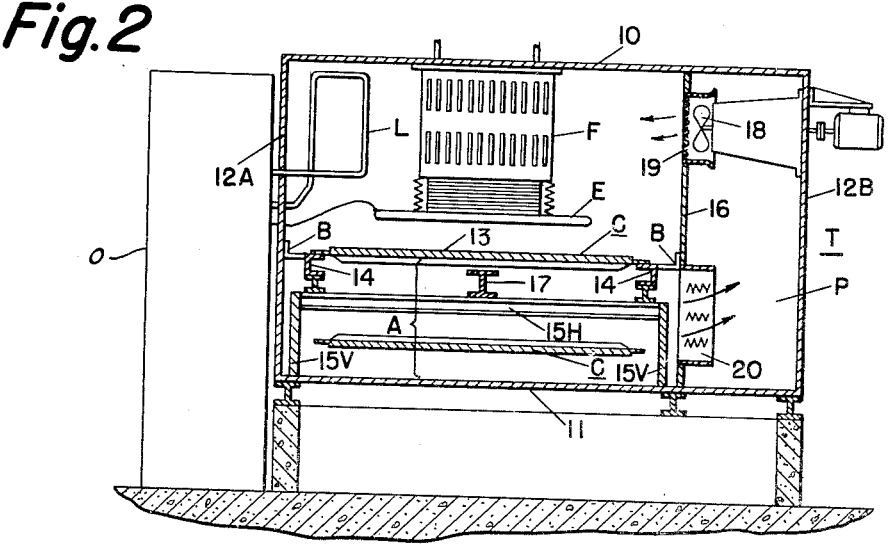
Fig. 2 is a transverse sectional elevation view of Fig. 1.

Referring to the drawings, the walls of a multiple tunnel structure T are of sheet metal suitably joined and reinforced by bracing elements not shown. A conveyor C which extends through the tunnel intermediate the top and bottom walls 10, 11 is preferably formed by a series of perforated metal plates 13 whose opposite ends, while the conveyor is passing through the tunnel, rest upon a contact bar, not shown, attached to an upper face of a pair of guide rails 14, 14 as shown in Fig. 2. Details of the conveyor, such as cross-links between the plates and the rolls or wheels which engage the upper face of the lower leg of the rails are not shown. The guide rails are suitably supported by a framework comprising a series of vertical members 15V interconnected by cross members 15H. A beam 17, supported by a plurality of cross members 15H and extending lengthwise of the tunnel, is spaced slightly below the upper flight of the conveyor to prevent excessive deflection of the conveyor plates when they are walked upon during construction of the apparatus or during its subsequent use.

The upper flight of the conveyor C transports load objects to be dielectrically heated beneath a series of upper heating electrodes exemplified by electrodes $E_1$, $E_2$, $E_3$ spaced lengthwise of the conveyor. In this particular illustrated embodiment each of these electrodes, generically represented by electrode E of Fig. 2, is attached to the lower end of a corresponding fin structure F whose upper end is fastened to the upper wall 10 of the tunnel structure. A pair of vertical partitions 16, 16 are spaced lengthwise of the tunnel (Fig. 1), each adjacent the right-hand edge, as viewed in Fig. 2, of a corresponding heating electrode. The contact strips of guide rails 14, 14 for the upper flight of the conveyor are electrically bonded by straps B to an external wall 12A of the tunnel structure and to the internal vertical partitions 16.

There is thus formed a series of dielectric heating tunnels each generically similar to those described and claimed in copending Warren application Serial No. 138,628, filed January 14, 1950, now abandoned in favor of Warren application Serial No. 419,633, filed March 26, 1954, the top flight of the conveyor C serving as the bottom wall of each tunnel and also as the lower heating electrode thereof.

For some applications, the conveyor C may be omitted in which case a stationary perforated sheet metal structure replaces the upper flight of conveyor C to serve as the lower electrode structure of the heating compartments and as a supporting surface along which the load objects are moved. As more fully explained in the aforesaid Warren application, each fin F forms the inductance of a resonant tunnel applicator whose capacity is chiefly that between a pair of heating electrodes, which in the illustrated embodiment comprise an upper electrode attached to the lower end of the fin and a lower electrode formed by the conveyor surface. The tunnels are respectively excited by high-frequency oscillators $O_1$, $O_2$ et seq. disposed, in the arrangement shown, externally of the multiple tunnel structure T and each coupled to its corresponding tunnel by a coupling coil or loop L. Preferred oscillator circuits which minimize variation in heating electrode voltage despite changes in power factor of the load, are described and claimed in the aforesaid Warren application. In the particular arrangement illustrated by the drawings, the oscillators are of very high power at least two of them individually capable of delivering about 200 kilowatts of high-frequency energy to air-foam rubber mattresses transported by the conveyor through the tunnel structure.

Figure 3:
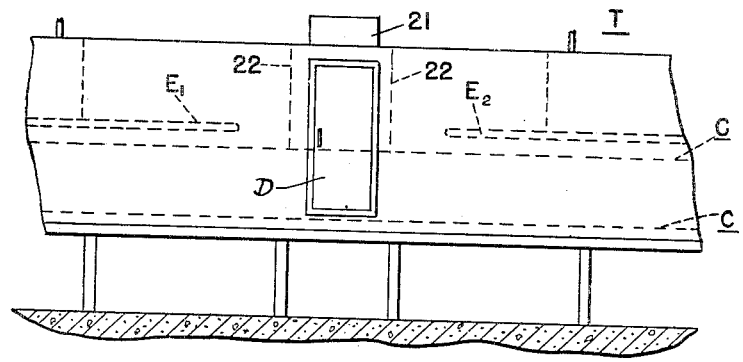
Fig. 3 is a side elevational view of parts shown in Fig. 1.
Figure 4:
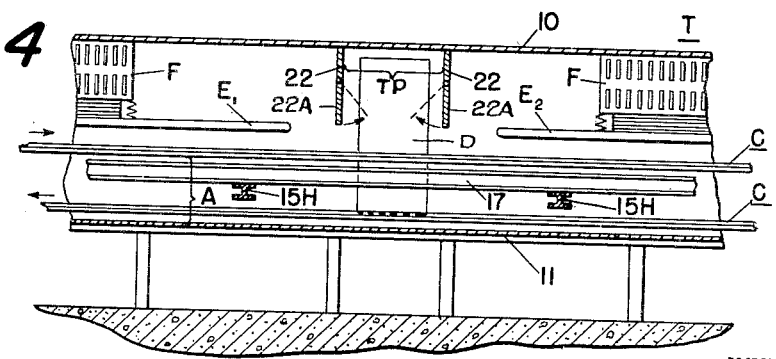
Fig. 4 is a side sectional elevation view showing parts appearing in Fig. 3.

For rapid removal of moisture released during dielectric heating of the mattresses or other loads, a series of ventilating fans 18 are disposed in a passageway P formed by the vertical partitioning 16 and the external wall 12B of the tunnel structure. Each fan, as best shown in Fig. 2, is disposed adjacent an opening 19 in the vertical partition 16 to direct air into the corresponding heating compartment. The fin F is preferably of the box type, specifically disclosed and claimed in copending application Serial No. 263,803, filed December 28, 1951, whose sides are apertured to permit passage of air from the fan through the fin into the tunnel space and downwardly through the fin and through the upper heating electrode which is perforated as shown. Air and entrapped moisture passing through the conveyor enters a duct A whose upper wall is formed by the conveyor, whose bottom wall is formed by the bottom 11 of the tunnel enclosure and whose side walls are respectively formed by the lower portion of wall 12A of the tunnel structure and the lower portion of the partitions 16. The cross-circulating air leaves this duct through an opening in the partition and passes through a heater 20 into the side passage P for recirculation. Fresh air enters duct A at the ends of the tunnel enclosure T and the exhaust air passes out of the tunnel enclosure T through an exhaust stack or duct 21 (Fig. 3).

Particularly because of the high-frequency involved, it is not practically possible with the arrangement as thus far described to prevent interchange of high-frequency energy between the successive heating zones. To minimize such transfer, there are provided transverse vertical partitions 22 between the adjacent ends of each two successive high-frequency heating electrodes. Preferably between adjacent heating compartments, there is a pair of such transverse partitions 22 sufficiently spaced to form a passageway TP extending transversely of the tunnel structure and in communication with the longitudinal passageway P. To permit access to these passageways, one and preferably both external side walls 12A, 12B of the tunnel enclosure are provided with metallic doors D which are closed when the apparatus is in operation. The partitioning 16, 22, in part defining each heating compartment, is at least in part movable above the plane of the conveyor C, or equivalent, as shown at 22A to permit entry into the heating compartment when necessary to extinguish fires or to make any replacement or adjustment of the conveyor or circuit elements within that compartment.

With the arrangement shown, the doors D are substantially shielded by the partitioning from the heating compartment so that any radiation from the tunnel enclosure T is not excessive despite the high power involved. Were the doors D disposed in walls 12A, 12B for direct access to the electrode compartments, it would be much more difficult to prevent escape from the tunnel enclosure of radiation in excess of limits fixed by law to preclude interference with other radio-frequency services such as radio-communication, television and the like. With the arrangement shown, the spaced transverse partitions 22, 22 between each two adjacent heating compartments, serve not only to prevent undesired coupling between the two adjacent high-power circuits of the tunnel enclosure but also shield the access doors in avoidance of radiation externally of the tunnel structure T from both compartments. Furthermore, since the doors D open into passageways within the tunnel but external to the heating compartments, they afford access to the ventilating equipment for maintenance without need to enter the heating compartments. Such shielding and access objectives are also obtained when the high-frequency heating electrodes are not attached to inductive fins to form tunnel applicators but are otherwise excited in any of various other ways known to the art.

Figure 1:
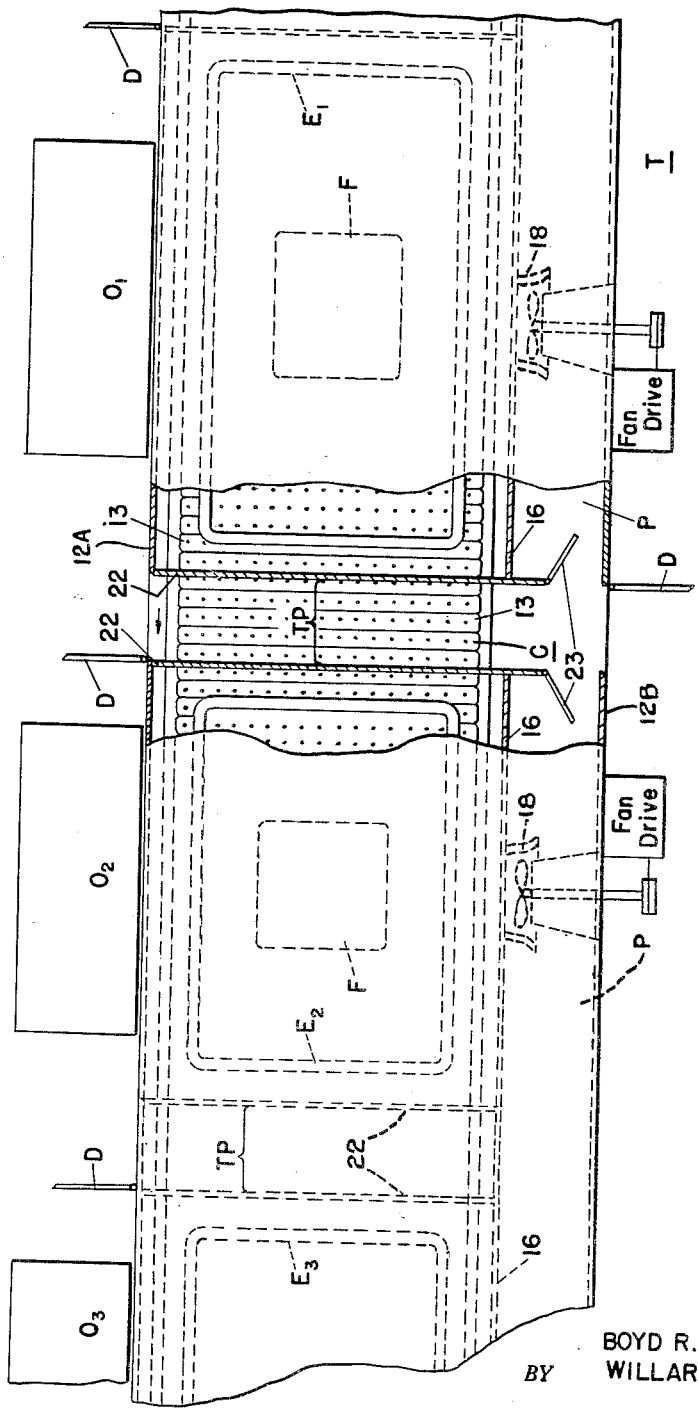
Fig. 1 is a plan view, in part broken away, of a portion of a multi-zone dielectric heating system.

To isolate the cross-circulation paths of the several fans, the longitudinal passage P may be compartmented by provision of the internal doors 23, each forming as shown in Fig. 1 a continuation of one of the transverse partitions 22.

The vertical partition 16 may be continuous throughout the length of tunnel T or it may be interrupted at the adjacent ends of one or more pairs of heating compartments to provide direct communication between passage P and any one or more of the transverse passages TP.

Suitable electrical interlock switches (not shown) are provided for the external doors D so that it is impossible to enter the passageways P, TP while the high-voltage, high-frequency circuits are excited.

It shall be understood the invention is not limited to the particular apparatus shown and that modifications may be made within the scope of the appended claims.

What is claimed is:

1. Dielectric heating apparatus comprising an elongated metallic tunnel structure providing a series of dielectric heating zones in each of which is disposed high-frequency heating-electrode structure, structure extending lengthwise of said tunnel to support load objects during transport thereof successively through said heating zones, means for permitting access to said heating zones comprising at least one door opening into said tunnel structure between adjacent heating zones, and a pair of metallic walls extending transversely of said tunnel structure on opposite sides of each door to minimize radiation therefrom of high-frequency energy from both adjacent heating zones and to provide a passageway between said adjacent heating zones, each of said transverse walls being at least in part movable for access from said passageway to the load objects and electrode structure in both adjacent heating zones.

2. Dielectric heating apparatus comprising an elongated metallic tunnel structure having spaced lengthwise thereof a plurality of resonant tunnel applicators each comprising a fin structure attached at one end to a wall of said tunnel structure and at the opposite end to heating electrode structure, a plurality of high-frequency oscillators respectively coupled to said resonant tunnel applicators to provide a series of dielectric heating zones, conveyor structure extending lengthwise of said tunnel structure to transport load objects successively through said heating zones, and means for permitting access to said heating zones comprising at least one door opening into said tunnel structure between adjacent heating zones, and a pair of metallic walls extending transversely of said tunnel structure on opposite sides of each door to minimize radiation therefrom of high-frequency energy from both adjacent tunnel applicators, said transverse walls each being at least in part movable for access to the load objects, conveyor, fin and electrode structure in both adjacent dielectric heating zones.

3. Dielectric heating apparatus comprising an elongated metallic tunnel structure, a series of two or more metal vertical partitions extending lengthwise of said tunnel structure in spaced alignment, a series of metal vertical partitions extending transversely of said tunnel structure each from one outer wall of said tunnel structure to one of said lengthwise partitions so to define a series of enclosed dielectric heating zones extending lengthwise of said tunnel structure with a passageway extending lengthwise of said tunnel structure and at least one transverse passageway between adjacent heating zones, a high-frequency heating electrode in each of said heating zones, a conveyor extending lengthwise of said tunnel structure to transport load objects successively through said heating zones, and at least one door opening through an outer wall of said tunnel structure into one of said passageways, at least one partition for each of said heating zones being at least in part movable for access from one of said passageways to the conveyor, work objects and electrode within the heating zone and said door being substantially shielded by the partitions to minimize radiation from said tunnel structure of high-frequency energy from said heating zones.

4. Dielectric heating apparatus comprising an elongated metallic tunnel structure, at least two electrodes disposed within and spaced in direction lengthwise of said tunnel structure, a corresponding number of fins disposed within and spaced in direction lengthwise of said tunnel structure, each of said fins being attached along one end to a wall of the tunnel structure and along the opposite free end attached to the corresponding electrode, each fin and associated electrode respectively providing the inductance and capacitance of a resonant tunnel applicator, conveyor means extending through said tunnel structure to transport load objects successively through dielectric heating zones respectively including said electrodes, at least one door opening into said tunnel structure between successive heating electrodes, and a pair of spaced metallic walls extending transversely of said tunnel structure on opposite sides of each door to shield it from the high-frequency energy of the resonant tunnel applicators of both adjacent heating zones and defining a passageway intermediate said zones, said transverse walls each being at least in part movable for access to either of the adjacent heating zones from said passageway.

5. Dielectric heating apparatus comprising an elongated metallic tunnel structure, a series of at least two high-frequency electrode structures within said tunnel and spaced lengthwise thereof, transverse and longitudinal vertical partitions disposed internally of said tunnel structure and cooperating with walls thereof to provide a series of heating compartments, one for each of said electrode structures, an elongated passageway extending along said heating compartments and a transverse passageway between adjacent heating enclosures, structure extending lengthwise of said tunnel structure for supporting load objects during transport successively through said heating compartments, and at least one door opening through a wall of said tunnel structure in one of said passageways, at least one of said partitions for each heating compartment being at least in part movable for access to the load objects and electrode structure within it and said door being shielded by the internal partitions to minimize radiation from said tunnel structure of high-frequency energy from said heating compartments.

6. Dielectric heating apparatus comprising an elongated metallic tunnel structure, a metallic endless conveyor extending through said tunnel structure to transport load objects to be dielectrically heated and to serve as a lower heating electrode, a series of electrodes spaced lengthwise of said tunnel structure and above said conveyor to serve as upper heating electrodes successively passed by load objects on said conveyor, a plurality of high-frequency oscillators respectively connected to said upper electrodes and in common connected to said conveyor, a series of vertical partitions spaced lengthwise of said tunnel structure, each adjacent one of said upper electrodes to define a dielectric heating zone and jointly defining a passageway extending lengthwise of said tunnel structure along said zones, at least one door opening through a wall of said tunnel structure for access to said passageway, and transverse partitions cooperating with said first-named partitions to minimize interchange of high-frequency energy between adjacent heating zones and to minimize radiation of said energy at the door, at least one partition for each heating zone being at least in part movable for access to the conveyor, load objects and upper electrode within it.

7. Dielectric heating apparatus comprising an elongated metallic tunnel structure, an endless conveyor extending through said tunnel structure to transport load objects to be dielectrically heated and to serve as a lower heating electrode, a series of upper electrodes spaced above said conveyor and longitudinally of said tunnel structure, a series of metallic fins spaced longitudinally of said tunnel structure, each extending downwardly from attachment to the top wall of the tunnel to one of said upper electrodes to provide elements of a high-frequency circuit resonated by the inductance of the fin and the capacitance between the upper electrode and the conveyor, a plurality of high-frequency oscillators respectively coupled to said high-frequency circuits, transverse and longitudinal vertical partitions disposed internally of said tunnel structure and coacting with walls thereof to provide a series of dielectric heating compartments each having therein the fin and attached upper electrode of one of said high-frequency circuits, an elongated passageway extending along said heating compartments and a transverse passageway between adjacent heating compartments, and a door opening through a wall of said tunnel structure into one of said passageways, said door being shielded by the partitions from high-frequency energy of said heating compartments, and said partitions being at least in part movable for access to the conveyor, load objects and high-frequency circuit elements.

8. Dielectric heating apparatus comprising an elongated metallic tunnel structure, a perforate conveyor extending through said tunnel to transport load objects, to serve as a lower heating electrode and to serve as the upper wall of a ventilating duct, a series of electrodes spaced above said conveyor and longitudinally of said tunnel structure to serve as upper heating electrodes successively passed by load objects on the conveyor, transverse and longitudinal vertical partitions disposed internally of said tunnel structure and cooperating with walls thereof to provide a series of heating compartments, one for each upper electrode structure, and a passageway extending along said heating compartments and in communication with said duct, ventilating equipment in said passageway for forcibly circulating air through said heating compartments into said duct, and at least one door opening from the exterior of said tunnel structure into said passageway for access to said ventilating equipment, said partitions shielding the door to minimize radiation of high-frequency energy from said tunnel structure and being at least in part movable for access to the load objects and electrodes within the heating compartments.

9. A dielectric heating apparatus comprising a metallic tunnel structure having a plurality of dielectric heating zones, high-frequency heating apparatus in each of said zones, means for supporting load objects during transport thereof successively through said heating zones, a pair of spaced metallic walls extending transversely of said tunnel structure between adjacent heating zones and defining a passageway between said adjacent heating zones, and means for permitting access into said passageway for maintenance and repair of the heating apparatus comprising a door in a wall of said tunnel structure opening into said passageway and shielded by said transverse walls from radiation of high-frequency energy from said adjacent heating zones.

10. A dielectric heating apparatus comprising metallic tunnel structure having at least two adjacent dielectric heating zones, high-frequency heating apparatus in each of said zones, means for supporting load objects during transport thereof successively through said heating zones, a pair of spaced metallic walls extending transversely of said tunnel structure between adjacent heating zones and defining a passageway between said adjacent heating zones, and means for permitting access into said passageway for maintenance and repair of the heating apparatus comprising a door in a wall of said tunnel structure opening into said passageway and shielded by said transverse walls from radiation of high-frequency energy from said adjacent heating zones.

References Cited in the file of this patent

UNITED STATES PATENTS

| Number | Name | Date |
| --- | --- | --- |
| 2,408,434 | Mann et al. | Oct. 1, 1946 |
| 2,467,230 | Revercomb et al. | Apr. 12, 1949 |
| 2,491,687 | Nutt | Dec. 20, 1949 |
| 2,500,676 | Hall et al. | Mar. 14, 1950 |
| 2,530,680 | Burkholder | Nov. 21, 1950 |
| 2,532,460 | Phillips, Jr. | Dec. 5, 1950 |
| 2,543,618 | Wood | Feb. 27, 1951 |
| 2,546,004 | Kinn | Mar. 20, 1951 |
| 2,560,763 | Griffith, Jr. | July 17, 1951 |
| 2,576,519 | Kopp | Nov. 27, 1951 |
| 2,580,200 | Shrimpton | Dec. 25, 1951 |

FOREIGN PATENTS

| Number | Country | Date |
| --- | --- | --- |
| 613,354 | Great Britain | Nov. 25, 1948 |